US011927944B2

(12) United States Patent
Gurajapu et al.

(10) Patent No.: US 11,927,944 B2
(45) Date of Patent: Mar. 12, 2024

(54) METHOD AND SYSTEM FOR CONNECTED ADVANCED FLARE ANALYTICS

(71) Applicant: HONEYWELL INTERNATIONAL INC., Morris Plains, NJ (US)

(72) Inventors: Prasanna Murthy Gurajapu, Bangolre (IN); Bimalananda Behera, Cuttack (IN); Varun Prabhaker, Bangalore (IN); Venkata Dhruva Pamulaparthy, morris plains (IN)

(73) Assignee: Honeywell International, Inc., Charlotte, NC (US)

( * ) Notice: Subject to any disclaimer, the term of this patent is extended or adjusted under 35 U.S.C. 154(b) by 354 days.

(21) Appl. No.: 16/861,522

(22) Filed: Apr. 29, 2020

(65) Prior Publication Data
US 2020/0387120 A1 Dec. 10, 2020

(30) Foreign Application Priority Data

Jun. 7, 2019 (IN) .............................. 201911022667

(51) Int. Cl.
*G05B 23/02* (2006.01)
*G05B 13/02* (2006.01)
(Continued)

(52) U.S. Cl.
CPC ....... *G05B 23/0227* (2013.01); *G05B 13/027* (2013.01); *G06N 3/08* (2013.01);
(Continued)

(58) Field of Classification Search
CPC .... G05B 13/027; G05B 23/0227; G06N 3/08; G06N 3/0472; G06N 3/0454;
(Continued)

(56) References Cited

U.S. PATENT DOCUMENTS 7,002,478 B2 * 2/2006 Moore ................. G08B 17/125
340/579
7,876,229 B2 1/2011 Rao et al.
(Continued)

FOREIGN PATENT DOCUMENTS

CN 106845410 A 6/2017
WO 2017058832 A1 4/2017

OTHER PUBLICATIONS

Prativadibhayankaram et al., "Compressive Online Video Background-Foreground Separation Using Multiple Prior Information and Optical Flow", 2018, Journal of Imaging (Year: 2018).*
(Continued)

*Primary Examiner* — YuJang Tswei
(74) *Attorney, Agent, or Firm* — Paschall & Associates, LLC; James C. Paschall; Anthony Miologos

(57) ABSTRACT

A method and system for advanced flare analytics in a flare operation monitoring and control system is disclosed that contains a data acquisition and augmentation mechanism whereby data is aquired through a plant network including images of the flare operations from single or multi-camera hubs. A machine learning-based self-adaptive industrial automation system process the images and data and assigns pixels to the images according to categories selected from smoke, flame and steam. The results of the analysis are displayed and a notice is issued when the percentage of pixles in a specific category falls outside a predeterminmed range.

20 Claims, 5 Drawing Sheets

(51) Int. Cl.
*G06N 3/08* (2023.01)
*G06V 10/75* (2022.01)
*G06V 10/764* (2022.01)
*G06V 10/82* (2022.01)
*G06V 20/52* (2022.01)
*G08B 17/12* (2006.01)

(52) U.S. Cl.
CPC ............ *G06V 10/764* (2022.01); *G06V 10/82* (2022.01); *G06V 20/52* (2022.01); *G06V 10/751* (2022.01); *G08B 17/125* (2013.01)

(58) Field of Classification Search
CPC ...... G06V 10/751; G06V 10/82; G06V 20/52; G08B 17/125; G06K 9/6273
See application file for complete search history.

(56) References Cited

U.S. PATENT DOCUMENTS

| | | | | |
|---|---|---|---|---|
| 8,138,927 | B2 | 3/2012 | Diepenbroek et al. | |
| 8,300,890 | B1* | 10/2012 | Gaikwad | H04N 5/144 382/173 |
| 9,594,359 | B2 | 3/2017 | Mohideen et al. | |
| 10,041,673 | B2 | 8/2018 | Pathangay et al. | |
| 2003/0141980 | A1* | 7/2003 | Moore | G08B 17/125 348/82 |
| 2010/0080417 | A1* | 4/2010 | Qureshi | G06V 10/469 700/59 |
| 2011/0085030 | A1* | 4/2011 | Poe | F23G 7/085 382/103 |
| 2014/0049491 | A1* | 2/2014 | Nagar | G06F 3/016 345/173 |
| 2015/0077263 | A1* | 3/2015 | Ali | F01D 21/003 340/679 |
| 2016/0116164 | A1* | 4/2016 | Ducharme | F23N 5/265 431/14 |
| 2018/0209853 | A1 | 7/2018 | Kraus et al. | |
| 2018/0276792 | A1* | 9/2018 | Stepanenko | H04N 23/698 |
| 2019/0146478 | A1* | 5/2019 | Cella | H04L 67/1097 702/188 |
| 2019/0155973 | A1* | 5/2019 | Morczinek | G01C 11/04 |
| 2019/0244504 | A1* | 8/2019 | Ebata | G08B 17/10 |
| 2019/0251702 | A1* | 8/2019 | Chandler | G10L 15/26 |
| 2019/0355128 | A1* | 11/2019 | Grauman | G06N 3/045 |
| 2020/0278465 | A1* | 9/2020 | Salman | G01V 1/301 |

OTHER PUBLICATIONS

Ig et al., "FlowNet 2.0_ Evolution of Optical Flow Estimation With Deep Networks", 2017, Computer Vision Foundation (Year: 2017).*

Bährecke, Automatic Classification and Visualisation of Gas from Infrared Video Data, 2015, KTH Technology and Health (Year: 2015).*

Taher, Deep learning for road area semantic segmentation in multispectral lidar data, Mar. 31, 2019, Aalto University (Year: 2019).*

Yuan et al, Deep smoke segmentation—May 10, 2019, Neurocomputing (Year: 2019).*

Xu et al., Video smoke detection based on deep saliency network, Jun. 30, 2018, Elsevier Ltd (Year: 2018).*

Umar et al. State of the art of smoke and fire detection using image processing, 2017, Inderscience Enterprises Ltd (Year: 2017).*

Search Report and Written Opinion for International Application No. PCT/US2020/035676, dated Sep. 17, 2020, ISA/RU.

EP Search Report for corresponding European Application No. 20178129.1 dated Oct. 23, 2020.

* cited by examiner

METHOD AND SYSTEM FOR CONNECTED ADVANCED FLARE ANALYTICS

CROSS-REFERENCE TO RELATED APPLICATION

This application claims priority under 35 U.S.C. § 119(b) to India Provisional Patent Application No. 201911022667, filed on Jun. 7, 2019. This provisional application is hereby incorporated by reference in its entirety.

TECHNICAL FIELD

The field relates generally to monitoring of flares for smoke emissions. Particularly, to a method and system for monitoring and controlling of flare operations in industrial plants.

BACKGROUND

The United States Environmental Protection Agency (EPA) has imposed strict regulations that heavily penalize the release of smoke into the atmosphere during flaring operations in industrial plant such as in the oil and gas industry. In the event of the reslease of smoke, a very short reaction window is provided for correction. To avoid non-compliance of EPA regulations, oil and gas companies employ human operators to mointor the flare operations continuously. However, the procedure of utilzing human operators contains the risk of error due to lapses in human judgement and attention.

There is a need for an intelligent automated system that performs continuous analysis on the flare to detect irregularities such as smoking. There is a need for such an intelligent automated system to issue timely alerts as to unfavorable conditions of the flaring operation. There is also a need for an automated system which continuously tracks and reports different flare scenarios even in low visibility, such as due to harsh weather conditions, or nightime darkness.

SUMMARY

This disclosure relates to a method and system for connected advanced flare analytics.

A first embodiment is directed to a method for monitoring and controlling flare operations of an industrial plant using a machine deep learning-based self-adaptive industrial automation system. The method comprises obtaining, from at least one camera, a sequence of real time images of the flare operation and obtaining data from a network of the industrial plant as to at least one flare parameter. The real time images and the data from the network are input into a machine deep learning configurable system module where the data is analyzed by the machine deep learning configurable system module using machine learning models and algorithms to assign the pixels of the images according to categories selected from smoke, flame, and steam. The results of the analysis are displayed, and a notice is issued when the percentage of pixels in a specific category falls outside a predetermined range.

A second embodiment is directed to a system for monitoring and controlling flare operations of an industrial plant using a machine deep learning-based self-adaptive configurable subsystem. The system comprising an analytics system having a processor including: an optical flow subsystem, a data augmentation subsystem and a machine deep learning based self-adaptive configurable subsystem. The system further includes a camera hub comprised of at least one camera and a processor configured to receive images from the at least one camera and transmit the images to the analytics system. A display receives the images from the analytics subsystem and is configured to display the images generated by the machine deep learning based self-adaptive configurable subsystem, wherein pixels of the images are categorized and displayed as smoke, steam, or flame.

A third embodiment is directed to a method of displaying flare operations of an industrial plant using a machine learning-based self-adaptive industrial automation system, the method comprising: dynamically displaying images of the flare operations processed by a machine deep learning configurable subsystem wherein pixels of camera images are categorized as smoke, steam, or flame. The method may further comprise dynamically displaying images of the flare operations in a live feed from a camera. The method may further comprise dynamically displaying a count of missed events and or mitigated events; dynamically displaying a representation of the percentage of pixels in each category; and dynamically displaying a graphical log of events.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
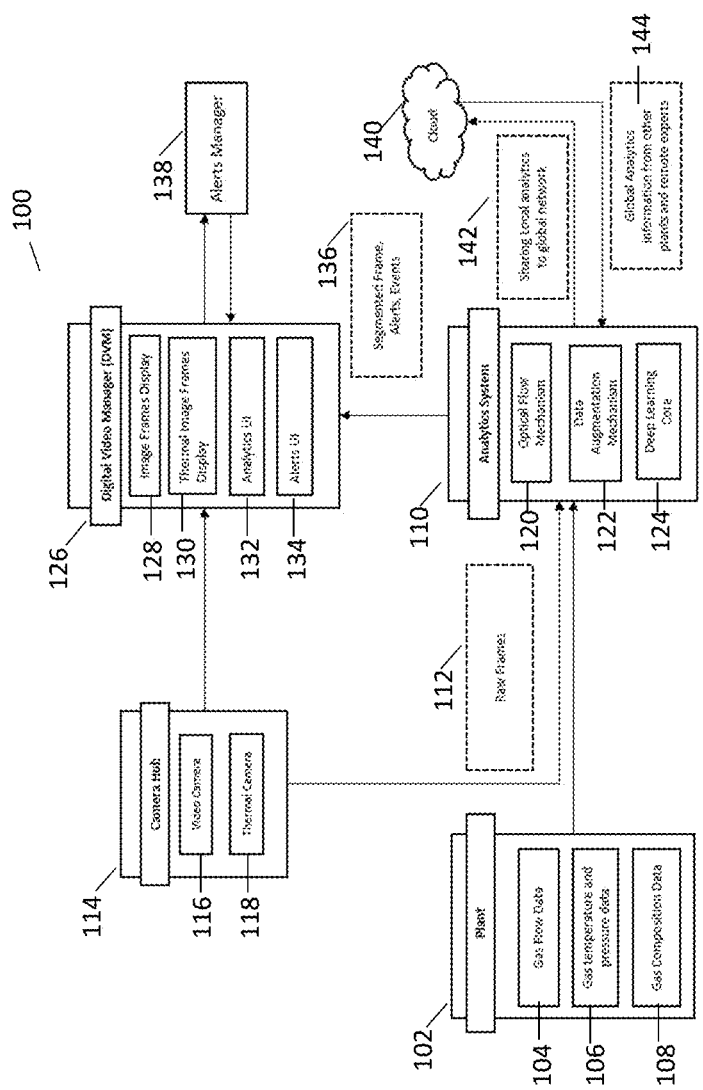
FIG. 1 is a block diagram of the advanced system for monitoring and controlling an industrial flare operation.

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Industrial flare stacks are an important feature of many of today's industrial plant operations. There is a need for monitoring and controlling industrial flare operations in industrial plants to continually provide enhanced levels of control even in challenging situations. There is a need for greater flexibility in the implementation and operation of industrial automation systems which include flare operations monitoring and control.

An operator can monitor a flare stack and a combustion process by observing the flare stack and tracking flare activity. Previous approaches to flare stack monitoring can include physically watching the flare stack and/or observing images captured of the flare stack by an optical imaging component. However, in either instance, the operator may have to perform manual actions in a system associated with the flare stack to identify and/or record the flare activity. Further, an optical imaging component may capture images at night (e.g., low light and/or no light) that are difficult to interpret. Recently, some federal and state authorities across the world have mandated recording of video images as evidence of compliance with various laws and ordinances. Others have moved to include flare stack monitoring methods, systems, and computer-readable and executable instructions that improve user efficiency and reduce manual action as compared to previous approaches. Flare stack monitoring can include processing thermal images captured of a flare stack area (e.g., an image of the flare stack and air space near the flare stack). The thermal images captured can be used, in various embodiments, to train a system to identify flare portions and smoke portions of the images based on the rate of movement of portions between a sequence of images. For instance, smoke particles can move faster than flare/flame particles. This is because smoke particles are less dense than particles that are on fire. Further, the thermal images can capture the flare stack activity in low lighting and/or reduced visibility, unlike an optical image.

Disclosed herein is a wholistic end-to-end solution to provide automated flare analytics, thus advancing the available flare operations monitoring and control systems. The end-to-end solution starts with data acquisition and continues all the way through final issuance of alerts and alarms. The system contains a data acquisition and augmentation mechanism whereby data is aquired through connected sensor systems which include single or multicamera hubs, flare gas temerature sensors, flare gas flow sensors and the like. The automated flare analytics system streamlines the data and converts the date to a format that is compatible with a deep learning core. The system further has an optical flow mechanism that generate motion information to distinguish background elements. The system has a deep learning core to perform the analytics. The system also has post processing mechanisms for data visualization, issing alerts, and logging events. There is an opportunity for compatibility with packages such as the Digital Video Manager, available from Honeywell International Inc. The disclsoure further provides for the opportunity of global connectivity through the cloud. The global connectivity provides continual improvement of the deep lerning core through learning from information sharing through a multisite neural-net. The global connectivity further provides for remote alerts and remote access to event logs and allows monitoring and aiding with global analytics by remote experts.

The system is unique in that it employs a machine learning/deep learning core that categorizes image frames at a pixel level, semantic segmentation, into regions of black smoke, steam and flame. The regions of smoke, steam, and flame are not defined shape objects as they are nonuniform and therefore previous image processing techniques were not able to sufficiently distinguish the specific categories. The machine learning/deep learning core provides a step forward in that the deep learning core is able to distinguish these categories in a significantly more reliable and consistent manner.

The machine learning may begin by training the model with images that have been annotated as portions that are black smoke, steam, and flame. In one embodiment, the annotation may be manual markings as to which portions are black smoke, which are steam, and which are flame. The annotated images are input into the machine learning/deep learning core and then the system may be fine-tuned further to arrive at the best results. The training data may then be separated from the test data to be analyzed. Accuracy may be at greater than 90% accuracy for all situations and greater than 95% for ideal conditions.

Challenges in monitoring and controlling flare gas operations include weather situations and clouds. For example, when analyzing images, clouds look like steam and it can be difficult to determine what is steam and what is a cloud. The deep learning core, using a deep neural network, is capable of distinguishing background elements such as clouds from relevant information such as smoke, steam, and flame to give accurate analytics. Further, the Optical Flow methods are applied in the deep learning core in order to take advantage of motion information between image frames from video and thermal cameras. Optical Flow methods are described in, for example, U.S. Pat. No. 10,041,673. Movement can be established by analyzing the current frame in a sequence of images in comparison to the previous frame. In this way the foreground images are distinguished from the background images and with other data of the deep learning core the steam can be distinguished from clouds.

The deep learning core is capable of processing augmentation of data such as raw images from video and thermal cameras, Optical Flow data from image sequences provided by video and thermal cameras and other data from the plant on gas flow related to properties of the flare gas such as flow temperature and composition. The method of this disclosure may be operated in all weather conditions due to the incorporation of the optical flow feature and the data augmentation feature.

The system may employ both a vision camera and a thermal camera. The inferencing from the images may employ images from the vision camera, from the thermal camera, or both. In good weather conditions and in the daytime inferences may be made from images of the vision camera alone. However, in bad weather, or at night, inferences may be made from the thermal images or the combination of thermal images along with vision camera images. Engaging both types of cameras to provide image input to the system results in a low percentage of false positive in the system results.

Furthermore, the system allows for multiple flare monitoring and control data to be analyzed and used to continually train the deep learning core. Multiple flares at an industrial plant may be monitored and controlled though a single system using a deep learning core. Similarly, multiple industrial plants, each having multiple flare operations may all be monitored and controlled through a single system having a deep learning core. In these connected operations, the deep learning core is continually refined with wide sets of data and over time becomes more efficient and more accurate in a wide range of conditions. In this way, operations at one industrial plant is being used to assist operations at a different industrial plant.

Turning to FIG. 1, a system block diagram is shown for system 100. Analytics system 110 receives input from plant 102 such as gas flow data 104, gas temperature and pressure data 106, and gas composition data 108. Analytics system 110 also receives raw image frames 112 from camera hub 114 having both a vision camera 116 and a thermal camera 118. Vision camera 116 may be a video camera.

Analytics system 110 has optical flow mechanism 120 which operates to separate the background from the data to be measured in the raw frames 112. Analytics system 110 also has data augmentation mechanism 122 which operates to augment the data input to analytics system 122 and then provides the augmented data to deep learning core 124 which is also part of analytics system 110. The purpose of the data augmentation mechanism is to augment the data to a form compatible to deep learning core 124. Together, the subsystems of optical flow mechanism 120, data augmentation mechanism 122 and deep learning core 124 provide the analytics on the input data and issues high accuracy results even under challenging conditions. For example, some raw frame images from a first flare at a first plant operating on a clear day and some raw frame images may be from a second flare at a second plant operating at night. Not all categories of smoke, steam, flame may be in both sets of images, yet the deep learning core needs to be able to analyze all situations. A Generative Adversarial Network system (GAN) may be utilized to simulate different weather and lighting conditions and prepare data augmentation and data generation for training the deep learning core.

Analytics system 110 provides data, such as segmented frame alerts and events 136 to digital video manager (DVM) 126 which is used to display information. In this embodiment shown in FIG. 1, DVM 126 can display a visual image frames display 128, a thermal image frames display 130, an analytics user interface 132, and an alerts user interface 134. Alerts manager 138 which communicates with and may be controlled by DVM 126, may be used to inform operators regarding out of limits situations in any flare. Smoking, excessive steam and the like are examples of alerts. Analytics system 110 may be connected to a cloud 140 in order to share local analytics to a global network 142. An operator accessing the global network would be able to assess flare operations across multiple different plant sites. Analytical system 110 also receives from cloud 140, global analytics information from other plants and remote experts 144. Incorporating global analytics information from other plants and remote experts into the continuing training of the deep learning core provides for a more robust and accurate system.

Figure 2:
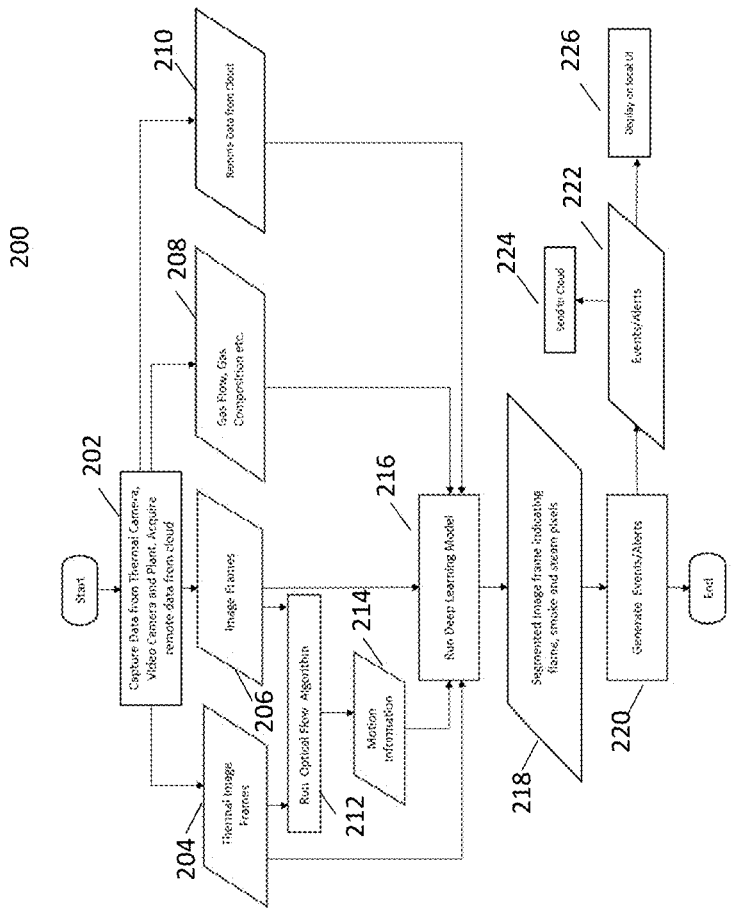
FIG. 2 is a flowchart of the learning algorithm of a deep learning core of a monitoring and control system for a flaring operation in an industrial plant.

Turning now to FIG. 2, a flowchart of the learning algorithm of a deep learning core of a monitoring and control system for a flaring operation in an industrial plant is shown. The method starts by capturing data from different sources and from multiple industrial plants 202. The data may be captured from visual cameras, thermal cameras, and data from the plant operations. Visual camera data may include time stamped image frames 206 obtained from a continuous video camera feed. Thermal camera data may include time stamped thermal image frames 204 obtained from a continuous thermal camera. Plant operations data may include flow rate and temperature of flare gas and flare gas composition 208. Remote data may be captured from the cloud 210 including global analytics and remote expert commentary and recommendations. The data arrives at the analytics system almost in real time. The acquisition may happen through either through edge or cloud network. Thermal image frames and visual image frames are input, 204 and 206 respectively, to the optical flow algorithm 212. Optical Flow methods are applied on incoming image frames to gather motion information between frames and augment with other acquired data. The motion information is secondary data derived by running Optical Flow algorithms on sequence of obtained thermal and video frames. The optical flow algorithm 212 separates the background information from the useful information and generates the motion information 214. The captured data of thermal images 204 and visual images 206 and the motion information 214 is input into the deep learning core 216. Captured data from the plant operations 208 is also input into deep learning core 216. Remote data from cloud storage 210 is also input into deep learning core 216.

The data input to the deep learning core is unpacked and augmented into a format that the deep learning core can process. The Deep Learning Model may be a variant of the Fully Convolution Neural Network architecture. The model can perform semantic segmentation of received frames to identify pixels of smoke, steam and flame. The model ingests frames from video and thermal cameras, motion information of pixels between frames and miscellaneous data on the flare gas obtained from plant. The motion information is gathered by applying state of the art optical flow methods between frames as a preprocessing step. The segmentation map generated by the Deep Learning model is then used to issue alerts. The deep learning core outputs analytics and segmented image frames indicating flame, smoke, and steam pixels 218. The frames are segmented at the pixel level. Each pixel that is not background is assigned a category of flame, smoke or steam. The segmentation map obtained from the deep learning core may be visualized in an operator user interface. Further processing steps are applied to issue alerts and log events as the segmented frames allow for the generation of events and alerts 220 which may be output 222 to a DVM or sent for cloud storage 224. Selected outputs may be displayed on a user interface 226. The results of the analytics may be shared globally through cloud connectivity. The analytics system may run on a graphics processing unit (GPU) enabled system or on a standalone platform.

The system may be integrated with Digital Video Manager available from Honeywell International Inc, and the results of the analytics may be communicated to the Digital Video Manager and displayed on an operator's display. Possible information provided to the operator include detection of a no flame condition, flame size tracking, steam plume detection and steam plume size information, instantaneous black smoke detection and smoke plume size information, visualization of steam, smoke, and flame regions in the flare stack video, continuous logging of events and issues of the alerts and alarms.

The system utilizes multiple networks, multiple types of images, sequences of multiple frames of types of images, and is able to separate background information from the information to be measured. The neural network of the deep learning core is trained and continuously trains to provide a pixel level classification into smoke steam or flame.

Figure 3:
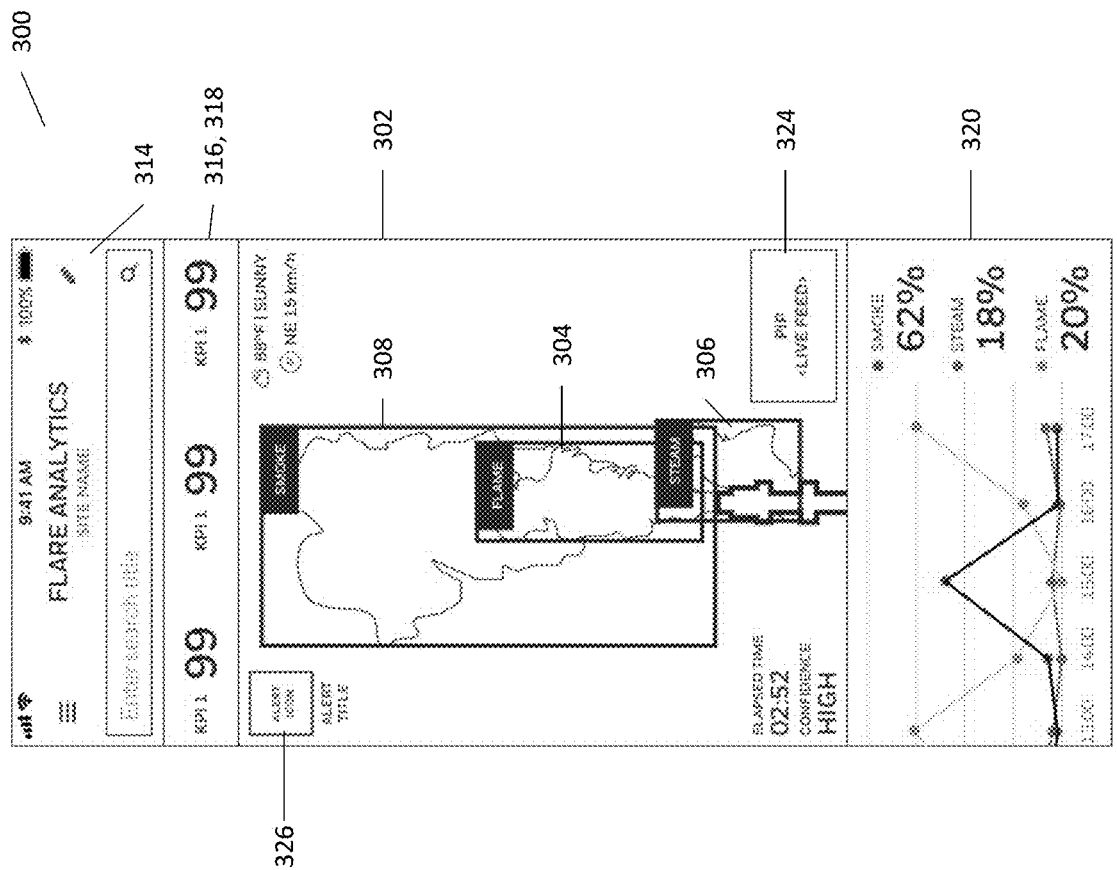
FIG. 3 is an example of a display of output from a monitoring and control system for a flaring operation in an industrial plant.

The graphical interface display for the results of the system may show a variety of results important to operators. As examples, the display maybe a mobile device or may be a stationary monitor. One such display is shown in FIG. 3. Display 300 shows panel 302 where the video frames that are being processed are displayed along with the categorization results at the pixel level into the flame category the steam category and the smoke category. The categories are organized in display masks for ready understanding by an operator and can be color coded as well. The processing of the images can include outputting an image with visual identification of flare portions and smoke portions and steam portions in each image. For instance, a visual color differentiation can be applied to a flare portion and a smoke portion of the images. Example color differentiation can include a scale range of colors based on an identified movement of each portion and/or based on thermal intensity identified in the images. In one embodiment pixels identified as flame may be colored green, pixels identified with smoke may be colored red, and pixels identified as steam may be colored purple. FIG. 3 shows flame in display mask 304, steam in display mask 306, and smoke in display mask 308. Display mask selection controls, such as a toggle or radial button, may provide the option of selecting or deselecting different display masks. Panel 302 may also show data such as date, time, flare identification, and the like as information data display 314. The number of mitigated events 316 and number of missed alarms 318 are also shown. Distribution 320 shows both the numeric readouts as well as graphicly, of the amounts of steam, flame and smoke present. Thresholds may be established for each category. The display may be interactive and can accept inputs from an operator.

The processing of the images can include outputting an image with visual identification of flare portions and/or smoke portions in each image. For instance, a visual color differentiation can be applied to a flare portion and a smoke portion of the images. Example color differentiation can include a scale range of colors based on an identified movement of each portion and/or based on thermal intensity identified in the images. Live feed 324 from cameras may be displayed as well as, alerts 326.

Figure 4:
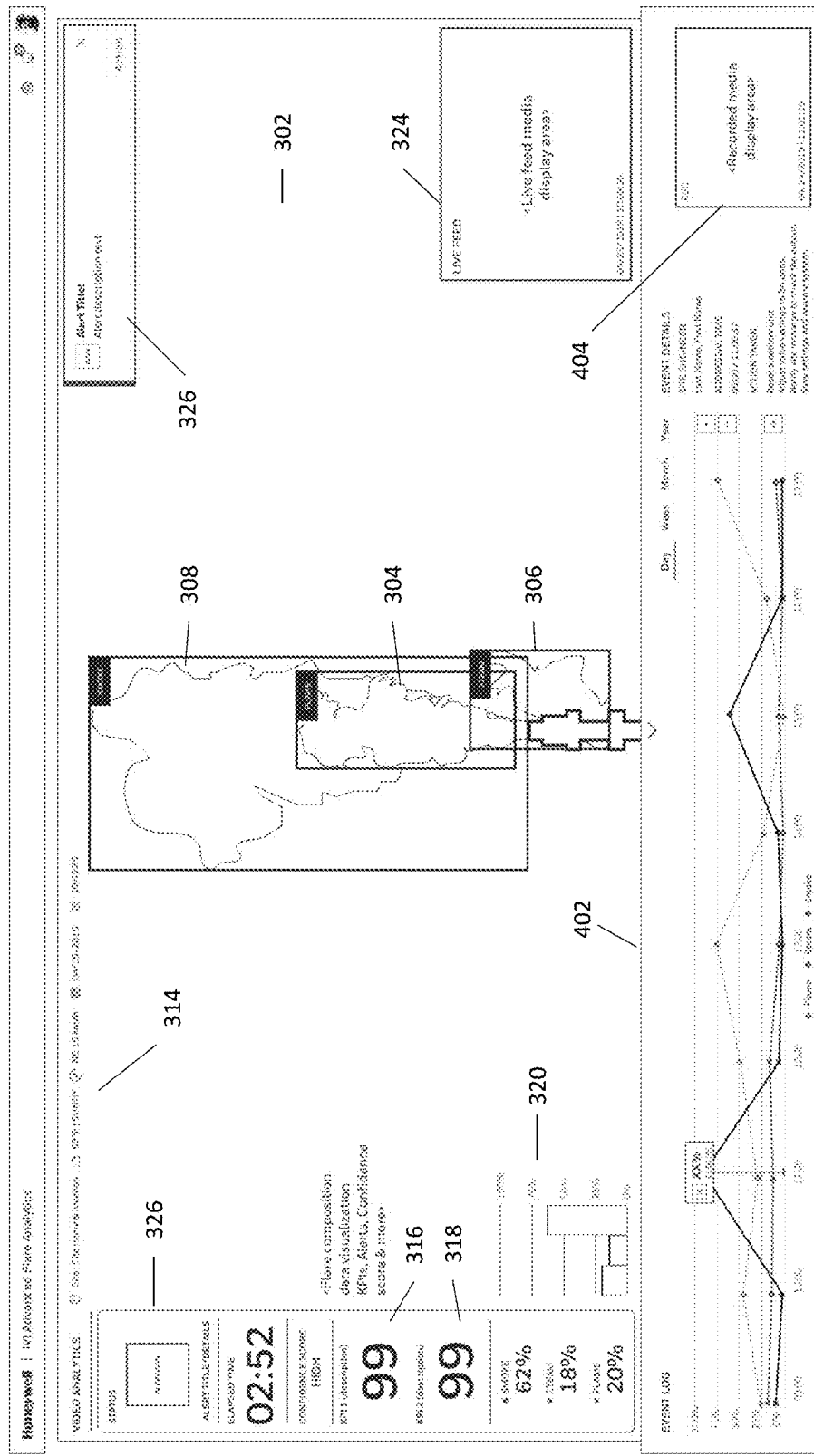
FIG. 4 is an example of a display of output from a monitoring and control system for a flaring operation in an industrial plant.
Figure 5:
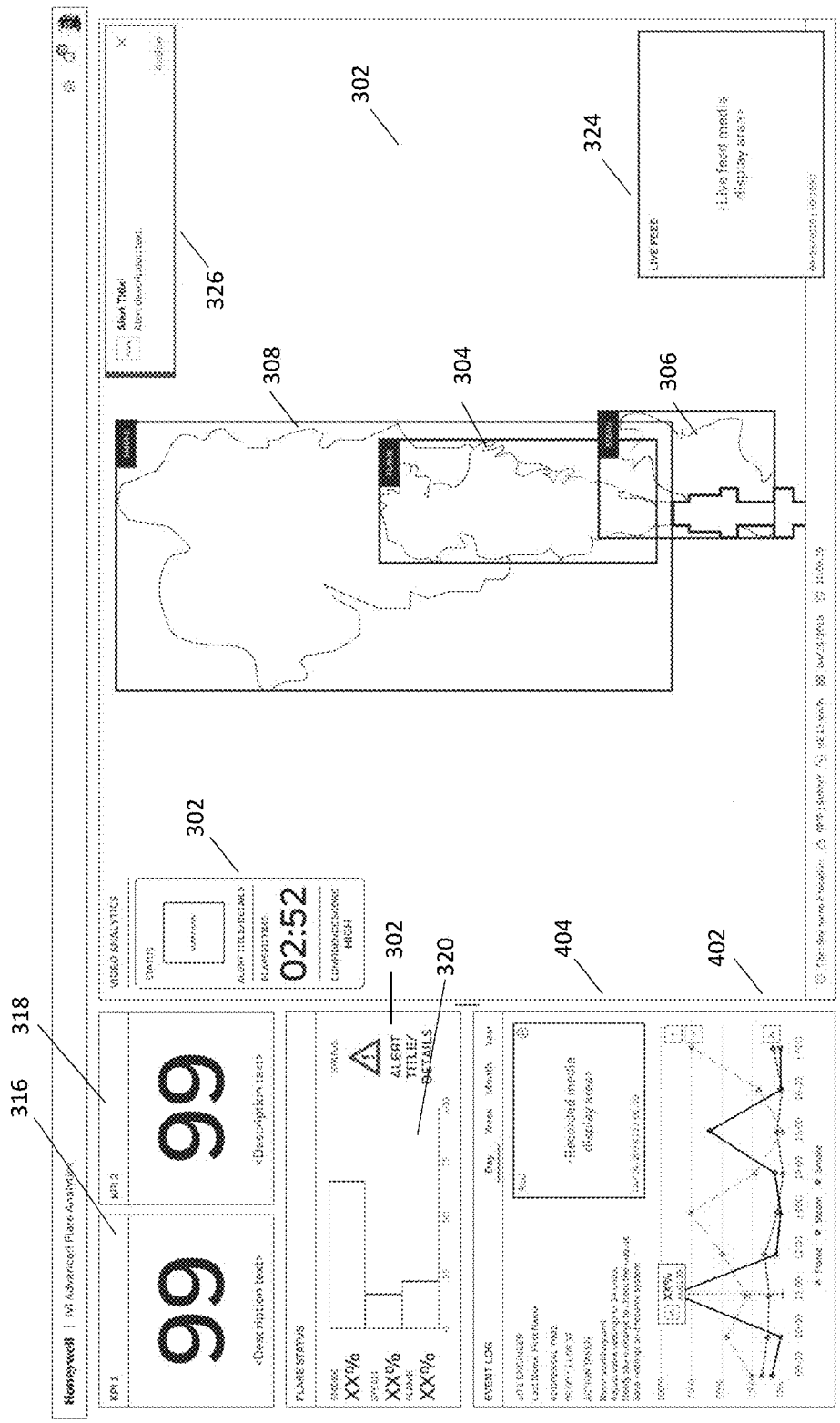
FIG. 5 is an example of a display of output from a monitoring and control system for a flaring operation in an industrial plant.

FIG. 4 shows another possible display. FIG. 4 may be displayed, for example on a monitor. Additional features to that shown in FIG. 3 include event log and trends 402 is shown allowing for visualization of the events and trends and recorded camera feed 404 that may be synchronized with event log 402. FIG. 5 Shows yet another alternative display.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for monitoring and controlling flare operations of an industrial plant using a machine deep learning-based self-adaptive industrial automation system comprising:
   (a) obtaining, from at least one camera, a sequence of real time images of the flare operation and obtaining data from a network of the industrial plant as to at least one flare parameter;
   (b) applying, an optical flow algorithm on the sequence of real time images to separate the background information from useful information to generate motion information;
   (c) inputting the real time images and the motion information to a machine deep learning configurable system module;
   (d) analyzing the data by the machine deep learning configurable system module using machine learning models and algorithms to assign pixels of the images to categories selected from smoke, flame, and steam;
   (e) generating a semantic segmentation map at a pixel level that categorizes segmented image frames indicating the smoke, flame, and steam based on the motion information of the pixels between frames of the sequence of real time images of the flare operation;
   (f) displaying the results of the generated segmentation map by the machine deep learning configurable system module; and
   (g) issuing a notice when the percentage of pixels in a specific category falls outside a predetermined range.

2. The method of claim 1 wherein the at least one camera comprises at least one video camera and at least one thermal camera.

3. The method of claim 1 further comprising adjusting at least one parameter of the real-time operation of the flare operation of the industrial facility based on the results of the analyzing data by the machine deep learning configurable system module.

4. The method of claim 1, wherein the machine learning configurable system module comprises a Fully Convolution Neural Network architecture or a variant thereof.

5. The method of claim 1 further comprising obtaining data from a cloud the data relating to a second or more flare operation of a second industrial plant.

6. The method of claim 1, further comprising generating the machine learning configurable system module comprising:
   training the machine learning models and algorithms using a first set of data from the obtained data and from historical data stored in a database; and
   validating the machine learning models and algorithms using a second set of data from the obtained data and from historical data stored in the database.

7. The method of claim 1, further comprising:
   displaying flare operations of the industrial plant using the machine learning-based self-adaptive industrial automation system; and
   dynamically displaying images of the flare operations processed by a machine deep learning configurable subsystem wherein the pixels of camera images are categorized as smoke, steam, or flame.

8. The method of claim 7 further comprising:
   dynamically displaying a count of missed events and/or mitigated events;
   dynamically displaying a representation of the percentage of pixels in each category; and
   dynamically displaying a graphical log of events.

9. The method of claim 8 wherein the processed pixels of the camera images of the flare operations, the count of missed events and/or mitigated events, the representation of the percentage of pixels in each category and the graphical log of events are displayed using a graphical user interface.

10. The method of claim 9 wherein the graphical user interface displays the pixels of the camera images of the flare operations on a display in three separate segments categorized as the steam, smoke, or flame.

11. The method of claim 9 wherein the graphical user interface displays the images to a user at a stationary monitor.

12. The method of claim 9 wherein the graphical user interface displays the images to a user at mobile device display.

13. The method of claim 7 further wherein the camera images of the flare operations is a live feed from at least one video camera.

14. The method of claim 7 further wherein the camera of the flare operations is a live feed from at least one thermal camera.

15. A system for monitoring and controlling flare operations of an industrial plant using a machine deep learning-based self-adaptive configurable subsystem comprising:
   a) an analytics system comprising a processor comprising:
      an optical flow subsystem;
         a data augmentation subsystem;
         the machine deep learning based self-adaptive configurable subsystem;
   b) a camera hub comprising at least one camera and a processor configured to:
      receive a sequence of real time images of the flare operation from the at least one camera and obtain data from a network of the industrial plant as to at least one flare parameter,
         apply, an optical flow algorithm on the sequence of real time images to separate the background information from useful information to generate motion information, and
         transmit the real time images and the motion information to the analytics system; and
   c) a display configured to receiving the images from the analytics system and display the images generated by the machine deep learning based self-adaptive configurable subsystem wherein pixels of the images are categorized and displayed as smoke, steam, or flame, and wherein the analytics system is configured to generate a semantic segmentation map at a pixel level that categorizes segmented image frames indicating the smoke, flame, and steam based on the motion information of the pixels between frames of the sequence of real time images of the flare operation.

16. The system of claim 15 wherein the analytic system receives data for at least one parameter of the operation of the industrial plant from an industrial plant network.

17. The system of claim 16, wherein the at least one camera comprises at least one video camera and at least one thermal camera each camera providing a sequence of real time images of the flare operation to the optical flow subsystem.

18. The system of claim 17, wherein the data augmentation subsystem comprises:
   a Fully Convolution Neural Network architecture or a variant thereof arranged to receive the real time images from the video and thermal cameras and the at least one plant parameter and augment the data into a form compatible for use by the machine deep learning based self-adaptive configurable subsystem; and
   transmit the augmented data to the deep learning based self-adaptive configurable subsystem.

19. The system of claim 18, wherein the machine deep learning based self-adaptive configurable subsystem includes at least one deep learning model that receives the augmented data from the augmentation subsystem that uses the deep learning model to analyze the augmented data and assigning categories to the pixels of the real time images, the pixels selected from smoke, flame, and steam.

20. The system of claim 15 wherein the analytic system further obtains data from a cloud the data relating to a second or more flare operation of a second industrial plant.

* * * * *